United States Patent
Hintennach et al.

(10) Patent No.: US 10,621,967 B2
(45) Date of Patent: Apr. 14, 2020

(54) ULTRASONIC LENS FOR RECEIVER APPLICATION

(71) Applicant: Sound Solutions International Co., Ltd., Beijing (CN)

(72) Inventors: Andreas Hintennach, Vienna (AT); Stefan Zangl, Vienna (AT)

(73) Assignee: Sound Solutions International Co., Ltd., Beijing (CN)

( * ) Notice: Subject to any disclaimer, the term of this patent is extended or adjusted under 35 U.S.C. 154(b) by 243 days.

(21) Appl. No.: 15/297,811

(22) Filed: Oct. 19, 2016

(65) Prior Publication Data

US 2017/0110109 A1 Apr. 20, 2017

Related U.S. Application Data

(60) Provisional application No. 62/243,510, filed on Oct. 19, 2015.

(51) Int. Cl.
*G10K 11/30* (2006.01)
*G01S 7/526* (2006.01)

(52) U.S. Cl.
CPC .............. *G10K 11/30* (2013.01); *G01S 7/526* (2013.01)

(58) Field of Classification Search
CPC ................................. G10K 11/30; G01S 7/526
See application file for complete search history.

(56) References Cited

U.S. PATENT DOCUMENTS

| 6,093,150 A * | 7/2000 | Chandler | A61B 8/12 600/459 |
| 9,842,583 B2 * | 12/2017 | Kunkel | G10K 11/30 |
| 2013/0241355 A1 * | 9/2013 | Okada | B06B 1/0622 310/334 |
| 2014/0204717 A1 * | 7/2014 | Kunkel | A61B 8/4272 367/137 |
| 2015/0157292 A1 * | 6/2015 | Gu | A61B 8/4444 600/459 |

FOREIGN PATENT DOCUMENTS

| JP | H03-291097 A | 12/1991 |
| JP | H05-024009 U | 3/1993 |
| JP | H08-223697 A | 8/1996 |

OTHER PUBLICATIONS

First Office Action dated Sep. 28, 2017 for counterpart German patent application No. 102016119824.2.

* cited by examiner

*Primary Examiner* — Hovhannes Baghdasaryan
(74) *Attorney, Agent, or Firm* — Steven McMahon Zeller; Dykema Gossett PLLC

(57) ABSTRACT

An improved ultrasonic lens and associated system is provided. Specifically, there is provided an ultrasonic lens with two sets of parallel sound ports operatively connected to an electrodynamic transducer to extend the working range of both audible and ultrasonic sound signals. The ultrasonic lens and electrodynamic transducer are situated so that the electrodynamic transducer axis and the sound port axes are aligned, whereby a shift in either the x or y axis direction will influence the ultrasound and audible behavior of the sound signal from the electrodynamic transducer.

10 Claims, 3 Drawing Sheets

ULTRASONIC LENS FOR RECEIVER APPLICATION

FIELD OF THE INVENTION

The present disclosure relates to electrodynamic transducers in an ultrasonic receiver, and in particular, to an ultrasonic lens in a receiver application that generates an extended working range covering both ultrasonic and audible ranges, for state of the art mobile communication systems. Accordingly, the present disclosure relates to generating an extended working range covering the audible range, as well as some bandwidth in the ultrasonic range. The ultrasonic lens transfers acoustic power from the electrodynamic transducer to the sound port of the mobile communication system, and also enhances acoustic performance in the audible range as well as in the ultrasonic range. The present disclosure further relates to a mobile or cellular telephone incorporating such a ultrasonic lens.

BACKGROUND OF THE INVENTION

Cellular or mobile telephones has become smaller in size and more importantly of a reduced width, however the demand for additional features and capabilities has increased, including a demand for improvements to the current features or functionality. Further, components required for new or improved features and functionality require additional space within the telephone housing, without increasing the size of that housing. In fact, based on the industry and consumers' desire to reduce the size of the housing in certain instances, the functions of two or more components have been combined to provide the required space, in certain instances. Along those lines, electrodynamic transducers, and in particular ultrasonic transducers allow for the requested functionality in mobile telephones, among other applications, while in instances, reducing the size of the housing of the telephone.

It is well known that transducers are devices that convert an energy from one form to another, and are useful in converting energy from a multitude of forms, such as electrical, mechanical, electromagnetic, chemical, acoustic, and thermal energy, among others.

Specifically, ultrasonic transducers convert electrical signals into ultrasound waves, or vice versa. Ultrasonic transducers typically utilize a transducer which can generate sound waves in the ultrasonic range, above 18 kHz, by turning electrical energy into sound, then upon receiving the echo turn the sound waves into electrical energy which can be measured and displayed.

One of the issues facing the mobile telephone industry is that to ultrasonic transducers are dedicated to the ultrasonic range, and not designed to work in the audible range. As such, the slit pattern of the sound port found within these components maximizes the ultrasonic range output only.

In a typical case where there is a desire for an extended working range covering both ultrasonic and audible ranges in a mobile phone, an ultrasonic lens is required to be installed in the device. Given the space constraints inside a mobile phone housing mentioned herein and the ever increasing desire for smaller and fewer components, it would be beneficial to provide an apparatus, method and a system for adding a ultrasonic lens functionality to a device, wherein no additional equipment or components are required.

It would be advantageous to provide such an ultrasonic transducer, or an ultrasonic lens, that is configured to generate an extended working range covering both ultrasonic and audible ranges to be used in state of the art mobile communication systems.

SUMMARY OF THE INVENTION

In accordance with the present disclosure, an improved apparatus, system and method is disclosed for an electrodynamic transducer capable of functioning as an ultrasonic lens for use in a mobile telephone. The ultrasonic lens transfers acoustic power from the electrodynamic transducer to the sound port of the mobile communication system, and also enhances acoustic performance in the audible range as well as in the ultrasonic range.

A standard mobile telephone receiver or a speaker, comprises any kind of receiver support, using either a rubber or plastic boot, to position the device in its intended position for best acoustic performance. The support is located in a frame which is ultimately connected to the outer area of the telephone by the use of an A-cover, which is typically glass or a similar material, then to the listener's ear.

A special mechanical design can be used to provide functionality to support the receiver in the ultrasonic range, approximately 30 kHz to 50 kHz, without influencing the functionality of the receiver in the audible range of approximately 150 Hz to 7 kHz. Certain lenses on the front of the device, create reflections in the ultrasonic range, which will boost the specific range for 10 dB. This type of lens can be either placed in the receiver support or directly on the receiver cover.

An objective of the present disclosure is that both the receiver axis and the sound port axis are in the same position, and any shift, in both direction, x and y, will influence the ultrasonic behavior and for even wider dimensions, the lower frequency range as well.

Other objects and advantages of the present disclosure will become apparent to one having ordinary skill in the art after reading the specification in light of the drawing figures, however, the spirit and scope of the present invention should not be limited to the description of the embodiments contained herein.

DETAILED DESCRIPTION OF EMBODIMENTS

As stated herein, the objective of the present disclosure is to provide an apparatus, system and methods for an ultrasonic lens in a receiver application that generates an extended working range covering both ultrasonic and audible ranges, for state of the art mobile communication systems.

The foregoing discussion is intended only to illustrate the present field and should not be taken as a disavowal of claim scope. As described herein, terms of orientation, such as upper, lower, top, bottom, left, right, front, back, side, longitudinal, horizontal, vertical, lateral, mid-point and end are used here to simplify the description in the context of the illustrated embodiments. Because other orientations are possible, however, the ultrasonic lens described herein should not be limited to the illustrated orientations. Those skilled in the art will appreciate that other orientations of the apparatus described herein are possible.

Figure 1:
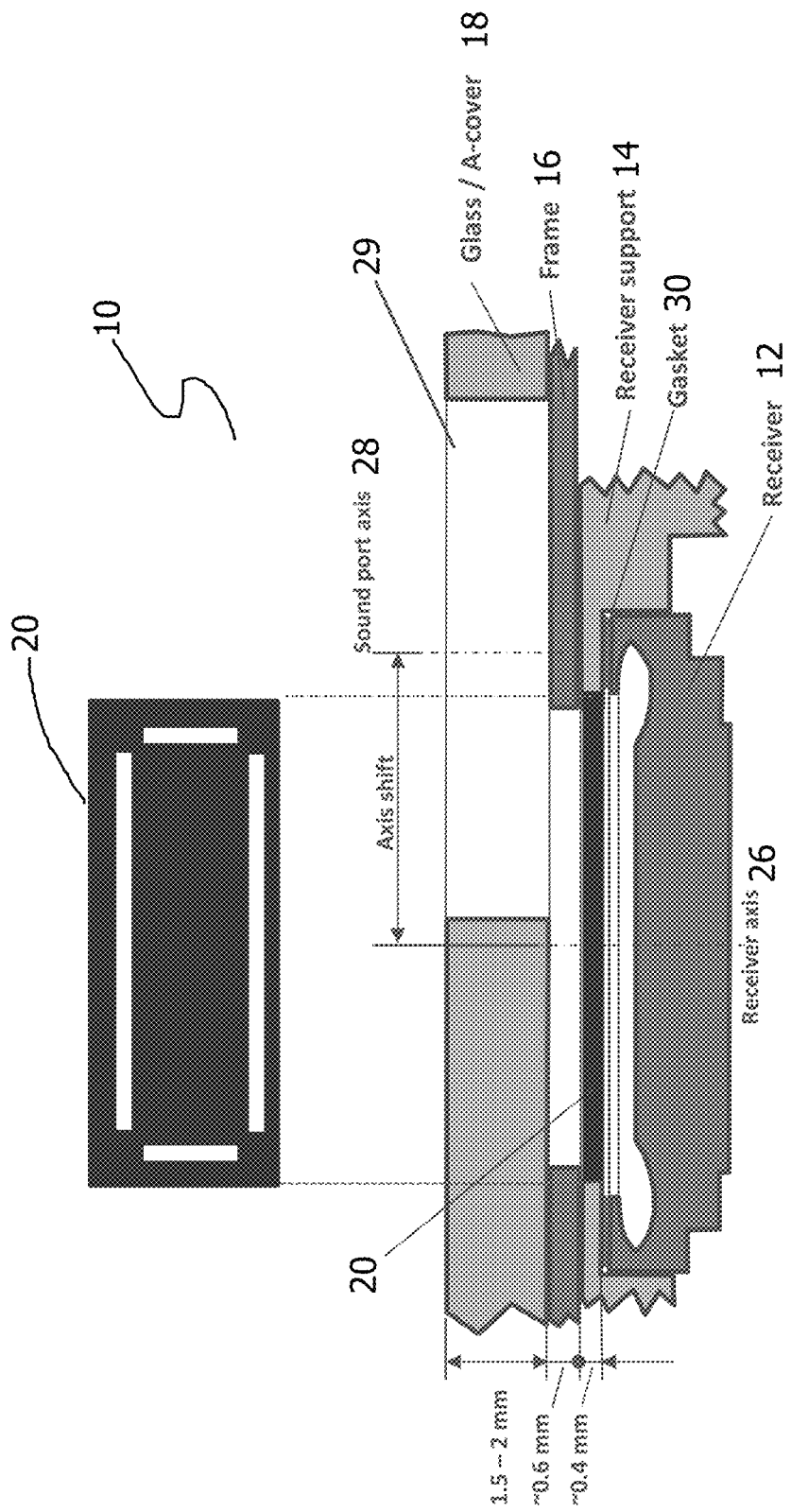
FIG. 1 shows a cross-sectional view of an embodiment of an ultrasonic lens in accordance with the present disclosure.

Referring to the drawings, wherein like reference numerals refer to the same or similar features in the various views, FIG. 1 shows a receiver system 10 to be used with mobile telephones and similar applications. The receiver system 10 comprises the receiver 12, for example, a 6×15×2.0 mm rectangular Franklin receiver, which is a high end miniature receiver, specifically designed for mobile phones and smartphones where high quality voice transmission is required. The Franklin receiver is a electrodynamic transducer, designed to translate electrical analog signals into sound. The input signal is fed into a coil in a magnetic field, which is attached to a membrane. Through the principle of the electromagnetic force, the membrane is moved according to the contents of the input signal.

In the preferred embodiment, the receiver system 10 comprises a receiver support 14, with a 0.4 mm thickness cover over the receiver 12, and a thin gasket 30 between the receiver 12 and the receiver support 14, along with a 0.6 mm frame 16, and an A-cover 18, which is between 1.5 and 2 mm thick and has a sound port 19 disposed therein, and usually made of glass. Of course, these measurements are those of the preferred embodiment and the receiver system 10 is not limited to these measurements.

Figure 2:
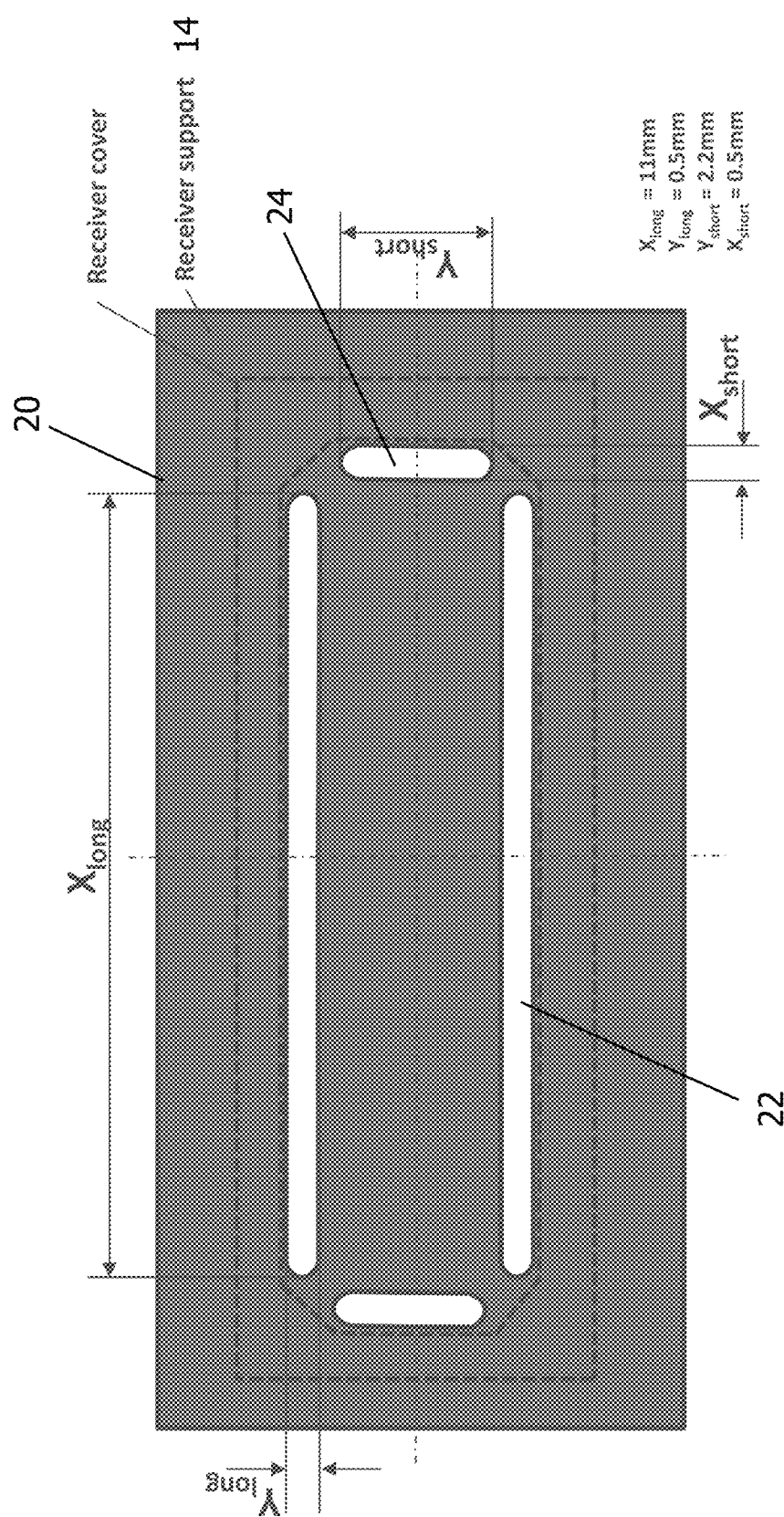
FIG. 2 shows a schematic lens shape of an ultrasonic lens in accordance with the present disclosure.

In order to increase the transfer of acoustic power from the electrodynamic transducer to the sound port of the mobile communication system, and also enhance acoustic performance in the audible range as well as in the ultrasonic range, an ultrasonic lens 20 as shown in FIGS. 1 and 2, is incorporated into the receiver system 10.

The ultrasonic lens 20 can be located within the receiver support 14, above a thin gasket 30, or directly on the receiver 12. The ultrasonic lens 20 is specially designed to keep the audible or listening range untouched, but improves the ultrasonic radiation, and can increase the sound pressure level up to additional 10 dB in the frequency range between 30 and 50 kHz.

Accordingly, the preferred embodiment of the ultrasonic lens 20 is configured with two sets of parallel sound ports 22, 24, with one set of sound ports 22, $X_{long}$ by $Y_{long}$, measured at 11.0 mm by 0.5 mm, and the other set of sound ports 24, $X_{short}$ by $Y_{short}$, measured at 2.2 mm by 0.5 mm. Again, these measurements are those of the preferred embodiment and the ultrasonic lens 20 is not limited to these measurements.

When the ultrasonic lens 20 is positioned on or in the receiver system 10, both the receiver axis 26 and the sound port axis 28 are in the same line, as any shift in both x and/or y direction will influence the ultrasonic behavior and for wider dimensions, the lower frequency range as well.

As described above, the preferred embodiment utilizes the Franklin ultrasonic receiver, which can provide certain design functionality including high sensitivity in the range of 71 dB/W/m, ultrasonic capabilities between 20 kHz and 50 kHz, additional dust protection meshes on rear, 6 kHz peak optimized for extended range without additional resonators, spring contacts for pick and place adaptability, compound membrane for minimum THD, Q-factor and tumbling, and 100% in-line measurement of all specified acoustical and electrical parameters.

Figure 3:
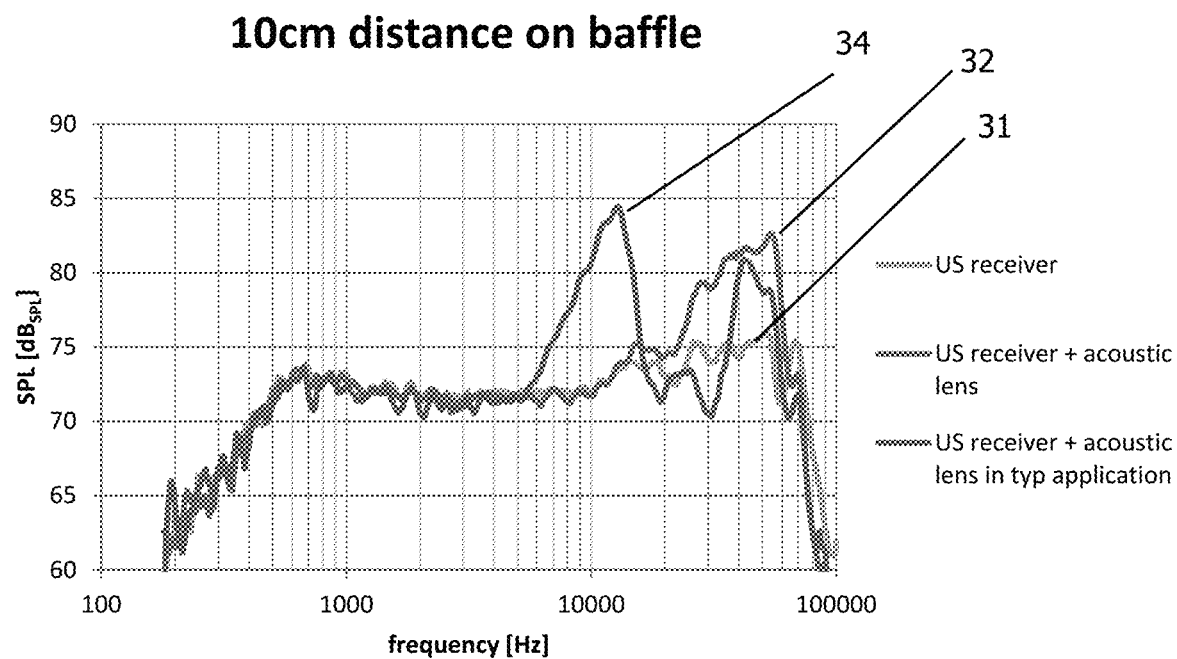
FIG. 3 shows a frequency versus sound pressure level graph for the ultrasonic lens in accordance with the present disclosure.
Figure 4:
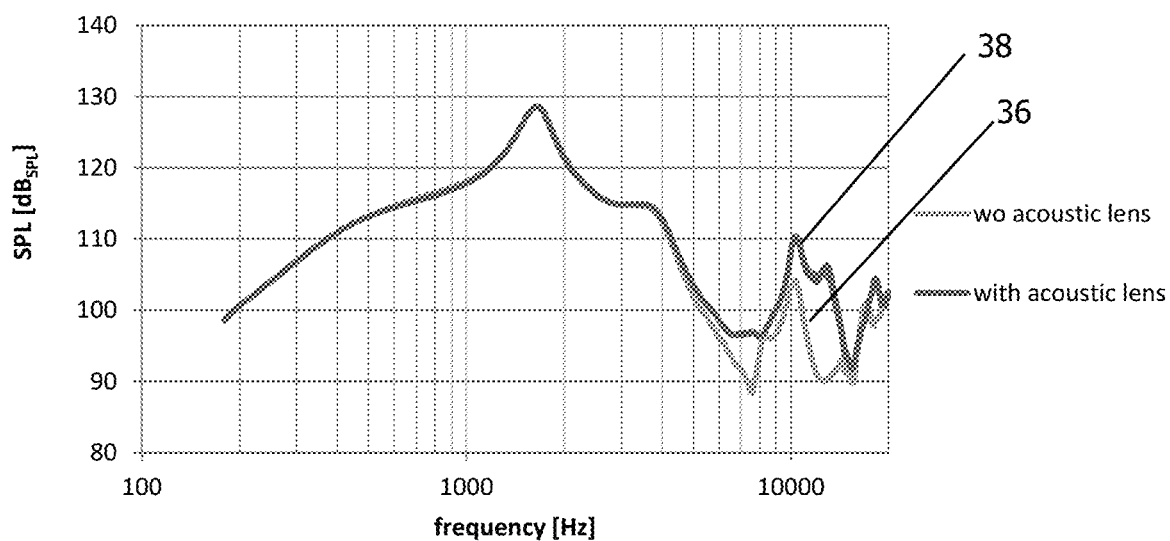
FIG. 4 shows a frequency versus sound pressure level graph for the ultrasonic lens in accordance with the present disclosure.

The advantages of the present disclosure are indicated in the frequency response graphs test results set out in FIGS. 3 and 4. For these tests, all measurements have been performed in 10 cm distance on baffle at 20 mW, with corresponding US capable microphone and measurement set up. For the frequency range, the front resonator peak of the microphone needs to be considered in the calibration, or a corresponding ultrasonic microphone, which shows a flat response, has to be used for these measurements.

In FIG. 3, a receiver was tested with and without the ultrasonic lens 20 of the present disclosure. The line 31 in FIG. 3 indicates the frequency response with just the receiver system 10 without the ultrasonic lens 20. The line 32 indicates the frequency response of the receiver system 10 with the ultrasonic lens 20 of the present disclosure, and the line 34 indicates the frequency response of the receiver system 10 with the ultrasonic lens 20 of the present disclosure in a typical application.

In FIG. 4, a receiver system 10 was tested with the use of a 3.2 high-leak coupler (not shown). The line 36 in FIG. 4 indicates the frequency response without the ultrasonic lens 20, and the line 38 indicates the frequency response with the ultrasonic lens 20.

As shown in the frequency responses in FIGS. 3 and 4, the use of the ultrasonic lens 20 in conjunction with the receiver system 10 generates an extended working range covering the audible range, as well as some bandwidth in the ultrasonic range. The ultrasonic lens 20 transfers acoustic power from the electrodynamic transducer to the sound port of the mobile communication system, and also enhances acoustic performance in the audible range as well as in the ultrasonic range.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details.

In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments" "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment. Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Although numerous embodiments of this invention have been described above with a certain degree of particularity, those skilled in the art could make numerous alterations to the disclosed embodiments without departing from the spirit or scope of this disclosure.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An acoustic device comprising:
   a support member;
   an electrodynamic transducer disposed within the support member, the electrodynamic transducer being configured to produce sound in the human audible range and in the ultrasonic range;
   a cover disposed on the support member opposite the electrodynamic transducer, the cover having a sound port through which the sound produced by the electrodynamic transducer is transmitted outside of the acoustic device; and
   an ultrasonic lens disposed within the sound path of the sound produced by the electrodynamic transducer, wherein the ultrasonic lens comprises a first and second set of two sound ports, each set of sound ports being parallel to each other, wherein the first and second set of two sound ports are first and second sets of two through holes in the ultrasonic lens.

2. The acoustic device of claim 1, wherein the ultrasonic lens is disposed within the support member and between the cover and the electrodynamic transducer.

3. The acoustic device of claim 2, wherein the ultrasonic lens is disposed directly on the electrodynamic transducer.

4. The acoustic device of claim 1, wherein the ultrasonic lens is disposed on the cover opposite the electrodynamic transducer.

5. The acoustic device of claim 1, wherein an axis of the electrodynamic transducer and an axis of the sound port are substantially the same.

6. The acoustic device of claim 1, wherein the sound ports of the first set being perpendicular to the sound ports of the second set.

7. The acoustic device of claim 6, wherein the ultrasonic lens comprises a rectangular shape and wherein the first set of sound ports are parallel to the length of the ultrasonic lens and the second set of sound ports are parallel to the width of the ultrasonic lens.

8. The acoustic device of claim 7, wherein the second set of sound ports have a length less than the space between the first set of sound ports.

9. The acoustic device of claim 1, further comprising a gasket disposed between the support member and the electrodynamic transducer.

10. The acoustic device of claim 9, wherein the ultrasonic lens is disposed directly on the gasket opposite the electrodynamic transducer.

* * * * *